United States Patent
Hervas

(10) Patent No.: US 7,177,984 B1
(45) Date of Patent: Feb. 13, 2007

(54) CACHE MANAGEMENT USING HISTORICAL ACCESS INFORMATION

(75) Inventor: Arnaud Hervas, Culver City, CA (US)

(73) Assignee: Apple Computer, Inc., Cupertino, CA (US)

( * ) Notice: Subject to any disclaimer, the term of this patent is extended or adjusted under 35 U.S.C. 154(b) by 242 days.

(21) Appl. No.: 10/825,815

(22) Filed: Apr. 16, 2004

(51) Int. Cl.
*G06F 12/00* (2006.01)

(52) U.S. Cl. ...................... 711/133; 711/158

(58) Field of Classification Search ............... 711/158, 711/133
See application file for complete search history.

(56) References Cited

U.S. PATENT DOCUMENTS 6,269,382 B1 *   7/2001   Cabrera et al. ............. 707/204
6,490,666 B1 *  12/2002   Cabrera et al. ............. 711/161
6,757,794 B2 *   6/2004   Cabrera et al. ............. 711/156

* cited by examiner

Primary Examiner—Hiep T. Nguyen
(74) Attorney, Agent, or Firm—Fenwick & West LLP

(57) ABSTRACT

A caching manager calculates cache priories for accessed items, including items not currently stored in the cache. The cache manager determines an item's cache priority as a function of the item's access frequency, retrieval cost and size. The cache manager dynamically updates cache priorities as items are accessed. When the cache is full and a non-cached item is accessed, the cache manager uses cache priorities to determine whether to overwrite a cached item with the non-cached accessed item. If the accessed item has a lower cache priority than all of the items in the cache, then the non-cached item is not stored in the cache. If any item in the cache has a lower cache priority than the accessed item, then the cache manager stores the accessed item in the cache, overwriting the cached item with the lowest cache priority.

35 Claims, 3 Drawing Sheets

CACHE MANAGEMENT USING HISTORICAL ACCESS INFORMATION

BACKGROUND

1. Field of Invention

The present invention relates generally to cache management, and more specifically to cache management using historical access information to determine which items to store in the cache.

2. Background of Invention

Many systems repeatedly access items from a set of stored data. The set of data items is commonly stored in persistent memory, such as on a magnetic drive. To speed up the access process, the accessing system often stores a subset of the data items in a cache in faster memory, such as random access memory, based upon the amount of space available therein.

Determining which items from the data set to store in the cache is a complicated problem. In the prior art, where the cache is full and the system accesses an uncached item, the system typically determines an existing item in the cache to overwrite with the accessed item. One prior art technique is to overwrite the least recently accessed cached item (this technique is known as LRU).

LRU appears to make sense on its face, but does not produce desirable results under all circumstances. Imagine a scenario in which a cache holds n items, and a system is repeatedly accessing a series of n+1 items in the order 1, 2 . . . n. This scenario could be, for example, a video player repeating a loop of n+1 frames. The player would access and cache items 1 through n, thereby filling the cache. The next item accessed would be n+1, which would be stored in the cache by overwriting item 1, the least recently accessed item in the cache. However, the next item the system would access after n+1 would be item 1, which would no longer be in the cache, and thus would have to be accessed from slow memory, and added to the cache by overwriting item 2. Because item 2 would then be needed, the system would have to retrieve it from slow memory, and so on ad infinitum, with they system never actually accessing an item from the cache. Of course this is the worst case scenario, but other less bad scenarios exist in which LRU still results in inefficient cache utilization.

In another prior art technique, the system overwrites the most recently utilized item in the cache (this is known as MRU). As one can see, this would avoid the worst case scenario for LRU described above, but can produce inefficient cache utilization under other circumstances. For example, suppose that the video player described above is replaying a frame x and its previous frame x-1 multiple times (e.g., during an editing session). By repeatedly, cyclically overwriting the most recently accessed frame x-1 with the currently accessed frame x and then overwriting most recently accessed frame 2 with currently accessed frame x-1, the system would never utilize the benefit of cache access, but instead always access x and x-1 from slow memory.

A more advanced prior art method determines whether all of the working data will fit in the cache, and utilizes LRU if so and MRU if not. This method, while better than either LRU or MRU on their own, still results in some inefficiencies and shortcomings of both methods under certain circumstances. Furthermore, the prior art techniques such as MRU and LRU, whether alone or in combination, do not take into account historical patterns of access requests over time when deciding which cache item to overwrite. Additionally, these methods only consider data in the cache, as opposed to all accessed data whether currently residing in the cache or not. As a result, the methods necessarily omit relevant information when managing a cache, and typically suffer in efficiency as a result.

What is needed are methods, systems and computer program products that utilize historical access information concerning historically accessed data items in order to robustly manage a cache.

SUMMARY OF THE INVENTION

A caching manager calculates cache priorities for accessed items, including those not currently stored in the cache. An item's priority is determined as a function of the item's access frequency, retrieval cost and size, and is updated dynamically as the item is accessed. When the cache is full and a non-cached item is accessed, the cache manager uses cache priorities to determine whether to overwrite a cached item with the non-cached accessed item. If the accessed item has a lower cache priority than all of the items in the cache, then the non-cached item is not stored in the cache. However, if any item in the cache has a lower cache priority than the accessed item, then the cache manager stores the accessed item in the cache, overwriting the cached item with the lowest cache priority.

Thus, the cache manager stores items in the cache based on their cache priority. Because the cache manager dynamically updates cache priorities responsive to requests for items, the cache priorities, and hence which items are stored in the cache, are a function of item access history.

The features and advantages described in this summary and the following detailed description are not all-inclusive, and particularly, many additional features and advantages will be apparent to one of ordinary skill in the art in view of the drawings, specification, and claims thereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
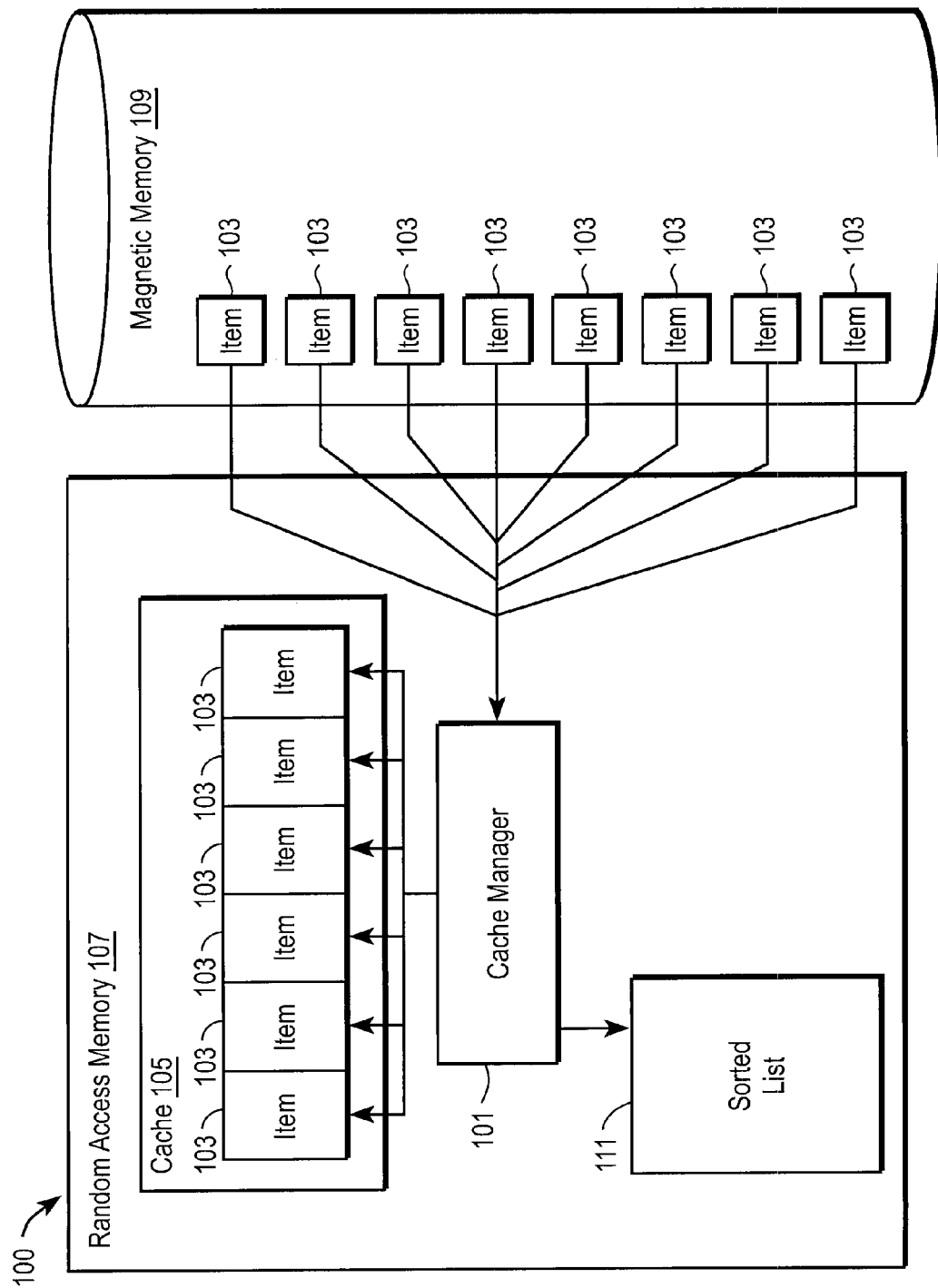
FIG. 1 is a block diagram, illustrating a high level overview of a system for using historical access information to manage a cache, according to some embodiments of the present invention.

FIG. 1 illustrates a high level overview of a system 100 for performing some embodiments of the present invention.

As illustrated in FIG. 1, a cache manager 101 accesses stored data items 103, and uses information concerning the access of these data items 103 over time to manage a cache 105. It is to be understood that although the cache manager 101 is illustrated as a single entity, as the term is used herein a cache manager 101 refers to a collection of functionalities which can be implemented as software, hardware, firmware or any combination of the three. Where a cache manager 101 is implemented as software, it can be implemented as a standalone program, but can also be implemented in other ways, for example as part of a larger program, as a plurality of separate programs, or as one or more statically or dynamically linked libraries.

As illustrated in FIG. 1, the cache manager 101 retrieves stored items 103, and stores a subset of those items 103 in a cache 105. Typically, items will be accessed when requested by another process, for example an application program (not shown). Note that although in FIG. 1 the cache 105 is illustrated as being in random access memory 107 and the non-cached stored data items 103 are illustrated as being in magnetic memory 109, other storage scenarios are possible in other environments, and are within the scope of the present invention. For example, a cache 105 can be located on a microprocessor, and non-cached items 103 can be stored on optical media.

In order to determine which items 103 to store in the cache 105, the cache manager 101 assigns a cache priority to each accessed item 103, as a function of the item's 103 size, retrieval cost and access frequency. As explained in greater detail below, the cache manager 101 uses cache priorities to determine which items 103 to store in the cache 105.

In some embodiments, the cache manager 101 calculates an item's 103 size relative to the size of the cache 105, for example by dividing the size of the item 103 by the size of the cache 105. This normalizes an item's 103 absolute size to account for the size of the actual cache 105 in use. In some embodiments, the cache manager 101 calculates an item's 103 retrieval cost as a function of the amount of time it takes to retrieve the item 103 when it is not cached, and the item's 103 size. For example, the cache manager 101 can divide the retrieval time for the item 103 by the size of the item 103, to get a normalized value of retrieval cost per unit (e.g., byte, pixel, etc) of the item 103. In some embodiments, the cache manager 101 calculates an item's 103 access frequency relative to the access frequency for other items 103, for example by dividing the number of requests for the item 103 during a period of time by the total number of requests for any item 103 during the same time period. It is to be understood that variations on these methodologies of calculating size, retrieval cost and access frequency are possible, and will be apparent to those of ordinary skill in the relevant art in light of this specification. Such alternatives are within the scope of the present invention.

In some embodiments, in order to calculate the actual cache priority for an item 103, the cache manager 101 multiplies the item's 103 size, retrieval cost and access frequency. In other embodiments, normalization factors (such as adjusting one or more operands up or down, for example by multiplying by a constant) are employed.

Each time access to an item 103 is requested, the cache manager 101 determines whether the requested item 103 has an assigned cache priority. If it does not, the cache manager 101 calculates a cache priority and assigns it to the item 103. If the item 103 already has an associated cache priority, the cache manager 101 updates that cache priority to reflect the request for the item 103 (the fact that the request has occurred affects the access frequency), thereby dynamically updating cache priorities as items 103 are accessed. Various implementation mechanics are possible for updating cache priorities accordingly, and will be apparent to those of ordinary skill in the relevant art in light of this specification. All such variations are within the scope of the present invention.

The cache manager 101 keeps track of cache priorities not only for items currently in the cache 105 but for other requested items 103 as well, including those that are not currently in the cache 105. To facilitate keeping track of the cache priorities, as illustrated in FIG. 1, in some embodiments the cache manager 101 maintains a sorted list 111 of associations between each accessed item 103 and its cache priority. The associations in the sorted list 111 can be in any format, for example a data structure containing the name or another identifier of the item 103, and its associated cache priority. Various association formats will be apparent to those of ordinary skill in the art in light of this specification, all of which are within the scope of the present invention. Of course, various specific ordered data structures can be used as (or in place of) a sorted list 111, for example a doubly or singly linked list, a b-tree, etc. The implementation mechanics of efficiently ordering and storing data are known in the art.

Figure 2:
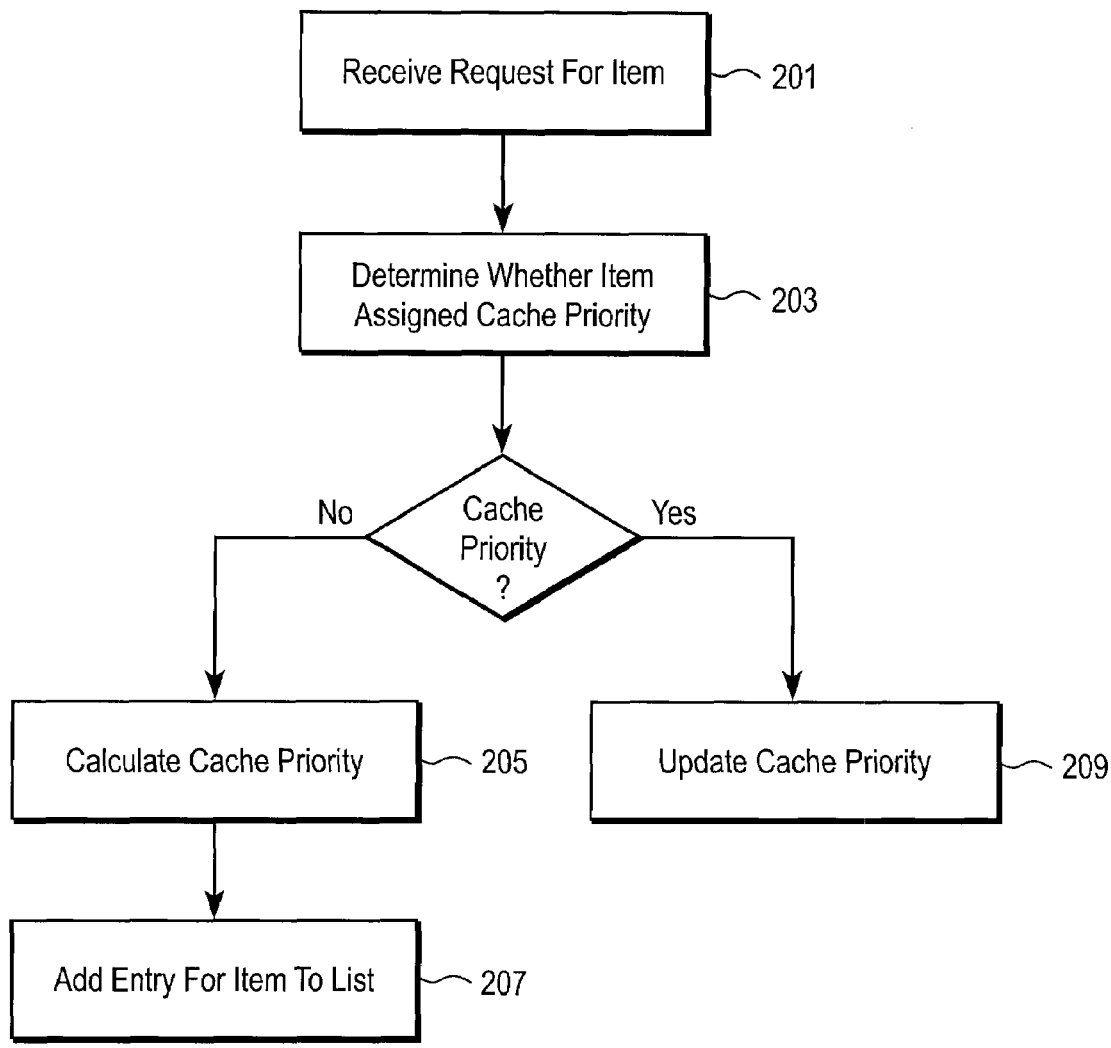
FIG. 2 is a flowchart, illustrating steps for the cache manager processing requests for items, according to some embodiments in which the cache manager maintains a sorted list.

Steps for the cache manager 101 processing requests for items 103 in some embodiments in which the cache manager 101 maintains a sorted list 111 are illustrated in FIG. 2. The cache manager 101 receives 201 a request for an item 103, and determines 203 whether the requested item 103 has been assigned a cache priority by reading the sorted list 111. The implementation mechanics of efficiently searching for specific data within an ordered data structure is known in the art. If the requested item 103 has not been assigned a cache priority, the cache manager 101 calculates 205 a cache priority for the item 103, and adds 207 an entry associating the requested item 103 with the cache priority to the sorted list 111. On the other hand, if the item 103 has already been assigned to a cache priority, the cache manager 101 updates 209 the requested item's 103 entry in the sorted list 111 to reflect the occurrence of the request for the item 103.

Figure 3:
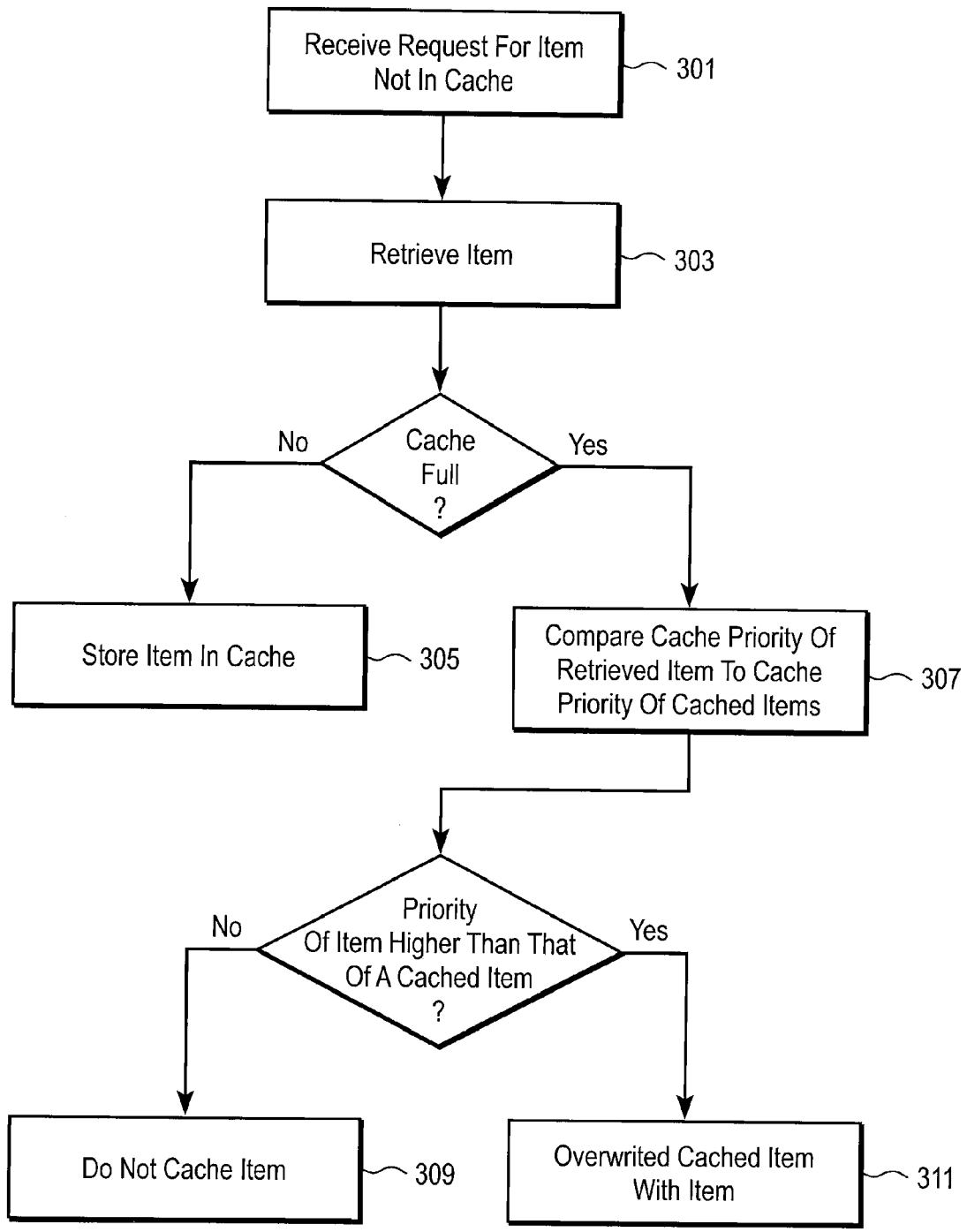
FIG. 3 is a flowchart, illustrating steps for the cache manager using cache priorities to determine which items to store in the cache, according to some embodiments of the present invention.

As indicated above, the cache manager 101 uses the cache priorities to determine which items 103 to store in the cache 105. This process is illustrated in FIG. 3, according to some embodiments of the present invention. The cache manager 101 receives 301 a request for an item 103 which is not in the cache 105. The cache manager 101 retrieves 303 the item 103 from storage, and determines whether the cache is full. If the cache 105 is not full, the cache manager 101 can simply store 305 the item 103 in the cache 105 for future access. However, if the cache manager 101 determines that the cache 105 is full, the cache manager 101 compares 307 the cache priority of the retrieved item 103 to the cache priority of each item 103 in the cache 105, to determine whether or not to overwrite a cached item 103 with the retrieved item 103. If the cache manager 101 determines that no item 103 in the cache 105 has a cache priority lower than the retrieved item 103, the cache manager 101 does not store 309 the retrieved item 103 in the cache 105. However, if the cache priority of at least one item 103 in the cache 105 is lower than the cache priority of the retrieved item 103, the cache manager 101 overwrites 311 the cached item 103 with the lowest cache priority with the retrieved item 103.

Thus, the cache manager 101 stores items 103 in the cache 105 based on their cache priority. Because the cache manager 101 dynamically updates cache priorities responsive to requests for items 103, the cache priorities, and hence which items 103 are stored in the cache 105, are a function of item 103 access history. Since historically accessed items 103 have cache priorities and not just those in the cache 105 at any one time, the access history is complete. Finally, by including item 103 size and retrieval cost in the cache priority as well as access frequency, the cache manager 101 is able to determine which items 103 to store in the cache 105 as a function of how likely the items 103 are to be accessed, as well as the cost of retrieving the items 103 if they are not cached, and the percentage of the cache 105 that the items 103 would require.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for managing a cache, the method comprising:
   assigning a cache priority to each of a plurality of accessed item as a function of the item's size, retrieval cost and access frequency;
   dynamically updating cache priorities as items are accessed; and
   determining which items to store in the cache as a function of cache priority.

2. The method of claim 1 further comprising:
   calculating an item's size relative to the size of the cache.

3. The method of claim 2 wherein calculating an item's size relative to the size of the cache further comprises:
   dividing the size of the item by the size of the cache.

4. The method of claim 1 further comprising:
   calculating an item's retrieval cost as a function of the item's retrieval time and the item's size.

5. The method of claim 4 wherein calculating an item's retrieval cost as a function of the item's retrieval time and the item's size;
   dividing the retrieval time of the item by the size of the item.

6. The method of claim 1 further comprising:
   calculating an item's access frequency relative to access frequency for other items.

7. The method of claim 6 wherein calculating an item's access frequency relative to access frequency for other items further comprises:
   dividing a number of requests for the item during a period of time by a total number of requests for items during the period of time.

8. The method of claim 1 further comprising:
   calculating cache priority for an item by multiplying the item's size, retrieval cost and access frequency.

9. The method of claim 1 further comprising:
   each time access to an item is requested, determining whether the requested item has been assigned a cache priority; and
   performing a step from a group of steps consisting of:
      responsive to determining that the requested item has not been assigned a cache priority, calculating a cache priority and assigning the calculated cache priority to the requested item; and
      responsive to determining that the requested item has been assigned a cache priority, updating the cache priority to reflect the request for the item.

10. The method of claim 1 further comprising:
    maintaining a sorted list of associations between each accessed item and its cache priority;
    each time access to an item is requested, determining whether the requested item has been assigned a cache priority by reading the sorted list; and
    performing a step from a group of steps consisting of:
       responsive to determining that the requested item has not been assigned a cache priority, calculating a cache priority and adding an entry associating the requested item with the cache priority to the sorted list; and
       responsive to determining that the requested item has been assigned a cache priority, updating the requested item's entry in the sorted list to reflect the request for the item.

11. The method of claim 1 wherein determining which items to store in the cache as a function of cache priority further comprises:
    receiving a request for an item not in the cache;
    retrieving the item;
    determining that the cache is full;
    comparing the cache priority of the retrieved item to the cache priority of each item in the cache; and
    performing a step from a group of steps consisting of:
       responsive to determining that the cache priority of at least one item in the cache is lower than the cache priority of the retrieved item, overwriting a cached item with the lowest cache priority with the retrieved item; and
       responsive to determining that no item in the cache has a cache priority lower than the retrieved item, not storing the retrieved item in the cache.

12. A computer readable medium containing a computer program product for managing a cache, the computer readable medium comprising:
    program code for assigning a cache priority to each of a plurality of accessed item as a function of the item's size, retrieval cost and access frequency;
    program code for dynamically updating cache priorities as items are accessed; and
    program code for determining which items to store in the cache as a function of cache priority.

13. The computer program product of claim 12 further comprising:
    program code for calculating an item's size relative to the size of the cache by dividing the size of the item by the size of the cache.

14. The computer program product of claim 12 further comprising:

program code for calculating an item's retrieval cost as a function of the item's retrieval time and the item's size by dividing the retrieval time of the item by the size of the item.

15. The computer program product of claim 12 further comprising:

program code for calculating an item's access frequency relative to access frequency for other items by dividing a number of requests for the item during a period of time by a total number of requests for items during the period of time.

16. The computer program product of claim 12 further comprising:

program code for calculating cache priority for an item by multiplying the item's size, retrieval cost and access frequency.

17. The computer program product of claim 12 further comprising:

program code for, each time access to an item is requested, determining whether the requested item has been assigned a cache priority; and program code for performing a step from a group of steps consisting of:

responsive to determining that the requested item has not been assigned a cache priority, calculating a cache priority and assigning the calculated cache priority to the requested item; and responsive to determining that the requested item has been assigned a cache priority, updating the cache priority to reflect the request for the item.

18. The computer program product of claim 12 further comprising:

program code for maintaining a sorted list of associations between each accessed item and its cache priority;

program code for, each time access to an item is requested, determining whether the requested item has been assigned a cache priority by reading the sorted list; and program code for performing a step from a group of steps consisting of:

responsive to determining that the requested item has not been assigned a cache priority, calculating a cache priority and adding an entry associating the requested item with the cache priority to the sorted list; and responsive to determining that the requested item has been assigned a cache priority, updating the requested item's entry in the sorted list to reflect the request for the item.

19. The computer program product of claim 12 wherein the program code for determining which items to store in the cache as a function of cache priority further comprises:

program code for receiving a request for an item not in the cache;

program code for retrieving the item;

program code for determining that the cache is full;

program code for comparing the cache priority of the retrieved item to the cache priority of each item in the cache; and program code for performing a step from a group of steps consisting of:

responsive to determining that the cache priority of at least one item in the cache is lower than the cache priority of the retrieved item, overwriting a cached item with the lower cache priority with the retrieval item; and responsive to determining that no item in the cache has a cache priority lower than the retrieved item, not storing the retrieved item in the cache.

20. A computer system for managing a cache, the computer system comprising:

means for assigning a cache priority to each of a plurality of accessed item as a function of the item's size, retrieval cost and access frequency;

means for dynamically updating cache priorities as items are accessed; and means for determining which items to store in the cache as a function of cache priority.

21. The computer system of claim 20 further comprising:

means for calculating an item's size relative to the size of the cache by dividing the size of the item by the size of the cache.

22. The computer system of claim 20 further comprising:

means for calculating an item's retrieval cost as a function of the item's retrieval item and the item's size by dividing the retrieval time of the item by the size of the item.

23. The computer system of claim 20 further comprising:

means for calculating an item's access frequency relative to access frequency for other items by dividing a number of requests for the item during a period of time by a total number of requests for items during the period of time.

24. The computer system of claim 20 further comprising:

means for calculating cache priority for an item by multiplying the item's size, retrieval cost and access frequency.

25. The computer system of claim 20 further comprising:

means for, each time access to an item is requested, determining whether the requested item has been assigned a cache priority; and means for performing a step from a group of steps consisting of:

responsive to determining that the requested item has not been assigned a cache priority, calculating a cache priority and assigning the calculated cache priority to the requested item; and responsive to determining that the requested item has been assigned a cache priority, updating the cache priority to reflect the request for the item.

26. The computer system of claim 20 further comprising:

means for maintaining a sorted list of associations between each accessed item and its cache priority;

means for, each time access to an item is requested, determining whether the requested item has been assigned a cache priority by reading the sorted list; and means for performing a step from a group of steps consisting of:

responsive to determining that the requested item has not been assigned a cache priority, calculating a cache priority and adding an entry associating the requested item with the cache priority to the sorted list; and responsive to determining that the requested item has been assigned a cache priority, updating the requested item's entry in the sorted list to reflect the request for the item.

27. The computer system of claim 20 wherein the means for determining which items to store in the cache as a function of cache priority further comprises:

means for receiving a request for an item not in the cache;
means for retrieving the item;
means for determining that the cache is full;
means for comparing the cache priority of the retrieved item to the cache priority of each item in the cache; and
means for performing a step from a group of steps consisting of:
  responsive to determining that the cache priority of at least one item in the cache is lower than the cache priority of the retrieved item, overwriting a cached item with the lowest cache priority with the retrieved item; and
  responsive to determining that no item in the cache has a cache priority lower than the retrieved item, not storing the retrieved item in the cache.

28. A computer system for managing a cache, the computer system comprising:
  a priority assigner configured to assign a cache priority to each of a plurality of accessed item as a function of the item's size, retrieval cost and access frequency;
  a priority updater configured to dynamically update cache priorities as items are accessed; and
  a storage determiner configured to determine which items to store in the cache as a function of cache priority.

29. The computer system of claim 28 further comprising:
a size calculator configured to calculate an item's size relative to the size of the cache by dividing the size of the item by the size of the cache.

30. The computer system of claim 28 further comprising:
a cost calculator configured to calculate an item's retrieval cost as a function of the item's retrieval time and the item's size by dividing the retrieval time of the item by the size of the item.

31. The computer system of claim 28 further comprising:
a frequency calculator configured to calculate an item's access frequency relative to access frequency for other items by dividing a number of requests for the item during a period of time by a total number of requests for items during the period of time.

32. The computer system of claim 28 further comprising:
a priority calculator configured to calculate cache priority for an item by multiplying the item's size, retrieval cost and access frequency.

33. The computer system of claim 28 further comprising:
an existence determiner configured to determine, each time access to an item is requested, whether the requested item has been assigned a cache priority; and
a priority determiner configured to perform a step from a group of steps consisting of:
  responsive to determining that the requested item has not been assigned a cache priority, calculating a cache priority and assigning the calculated cache priority to the requested item; and
  responsive to determining that the requested item has been assigned a cache priority, updating the cache priority to reflect the request for the item.

34. The computer system of claim 28 further comprising:
an association maintainer configured to maintain a sorted list of associations between each accessed item and its cache priority;
an existence determiner configured to determine, each time access of an item is requested, whether the requested item has been assigned a cache priority by reading the sorted list; and
a priority determiner configured to perform a step from a group of steps consisting of:
  responsive to determining that the requested item has not been assigned a cache priority, calculating a cache priority and adding an entry associating the requested item with the cache priority to the sorted list; and
  responsive to determining that the requested item has been assigned a cache priority, updating the requested item's entry in the sorted list to reflect the request for the item.

35. The computer system of claim 28 wherein the storage determiner further comprises:
a request receiver configured to receive a request for an item not in the cache;
an item retriever configured to retrieve the item;
a fullness determiner configured to determine that the cache is full;
a priority comparer configured to compare the cache priority of the retrieved item to the cache priority of each item in the cache; and
a cache modifier configured to perform a step from a group of steps consisting of:
  responsive to determining that the cache priority of at least one item in the cache is lower than the cache priority of the retrieved item, overwriting a cached item with the lower cache priority with the retrieved item; and
  responsive to determining that no item in the cache has a cache priority lower than the retrieved item, not storing the retrieved item in the cache.

* * * * *

UNITED STATES PATENT AND TRADEMARK OFFICE
CERTIFICATE OF CORRECTION

PATENT NO. : 7,177,984 B1  Page 1 of 1
APPLICATION NO. : 10/825815
DATED : February 13, 2007
INVENTOR(S) : Arnaud Hervas It is certified that error appears in the above-identified patent and that said Letters Patent is hereby corrected as shown below:

Column 8, line 2, please delete "lower" and insert --lowest--

Column 8, line 2, please delete "retrieval" and insert --retrieved--

Column 8, line 22, please delete "item's retrieval item" and insert --item's retrieval time--

Column 10, line 13, please delete "of" and insert --to--

Column 10, line 42, please delete "lower" and insert --lowest--

Signed and Sealed this

Seventeenth Day of April, 2007

JON W. DUDAS
*Director of the United States Patent and Trademark Office*